United States Patent
Tsunashima

(10) Patent No.: US 11,347,124 B2
(45) Date of Patent: May 31, 2022

(54) ELECTRONIC APPARATUS INCORPORATING CAMERA AND DISPLAY DEVICE

(71) Applicant: Japan Display Inc., Tokyo (JP)

(72) Inventor: Takanori Tsunashima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/353,066

(22) Filed: Jun. 21, 2021

(65) Prior Publication Data

US 2021/0311366 A1    Oct. 7, 2021

Related U.S. Application Data

(63) Continuation of application No. PCT/JP2019/037714, filed on Sep. 25, 2019.

(30) Foreign Application Priority Data

Dec. 21, 2018 (JP) .............................. JP2018-239923

(51) Int. Cl.
    *G02F 1/1362* (2006.01)
    *G02F 1/1335* (2006.01)
    *G02F 1/1343* (2006.01)
    *G02F 1/1368* (2006.01)

(52) U.S. Cl.
    CPC ...... *G02F 1/136286* (2013.01); *G02F 1/1368* (2013.01); *G02F 1/13439* (2013.01); *G02F 1/133512* (2013.01)

(58) Field of Classification Search
    CPC ......... G02F 1/136286; G02F 1/133512; G02F 1/13439; G02F 1/1368
    USPC .......................................................... 349/43
    See application file for complete search history.

(56) References Cited

U.S. PATENT DOCUMENTS

2016/0161664 A1*  6/2016  Ishida ............... G02B 6/0061
                                                          359/230
2017/0053592 A1    2/2017  Shin et al.
2021/0072587 A1*  3/2021  Tang ................. G02F 1/133528

FOREIGN PATENT DOCUMENTS

JP       2017-40908 A      2/2017
WO    WO 2015/022887 A1    2/2015

OTHER PUBLICATIONS

International Search Report dated Nov. 19, 2019 in PCT/JP2019/037714, filed on Sep. 25, 2019, 1 page.

* cited by examiner

Primary Examiner — Nathanael R Briggs
Assistant Examiner — William D Peterson
(74) Attorney, Agent, or Firm — Oblon, McClelland, Maier & Neustadt, L.L.P.

(57) ABSTRACT

According to one embodiment, an electronic apparatus includes a camera and a liquid crystal panel including a display portion which overlaps the camera. The liquid crystal panel includes a first transparent electrode which overlaps the camera and a light-shielding layer including a first opening having a circular shape and superposed on the first transparent electrode.

9 Claims, 13 Drawing Sheets

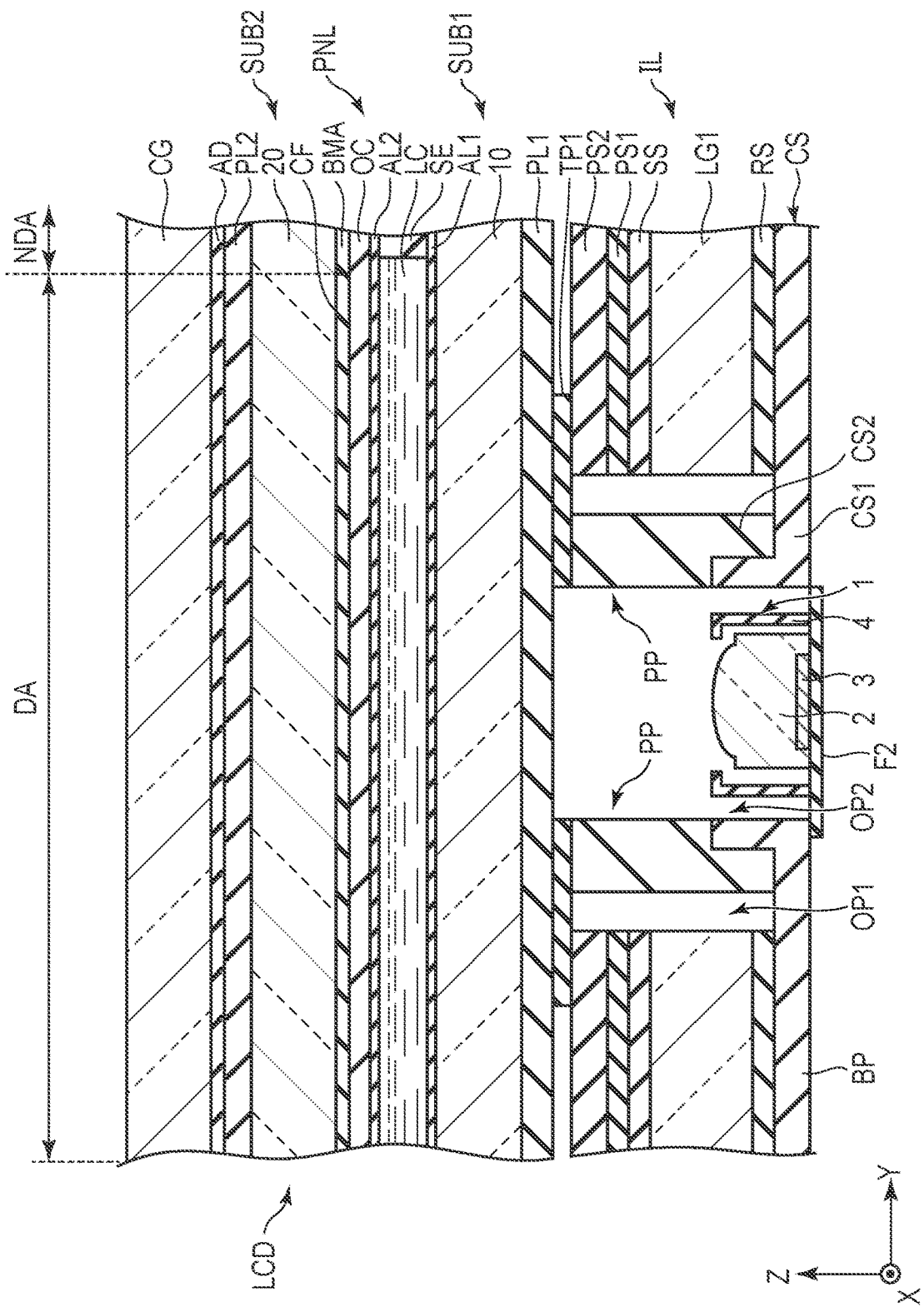
F I G. 2

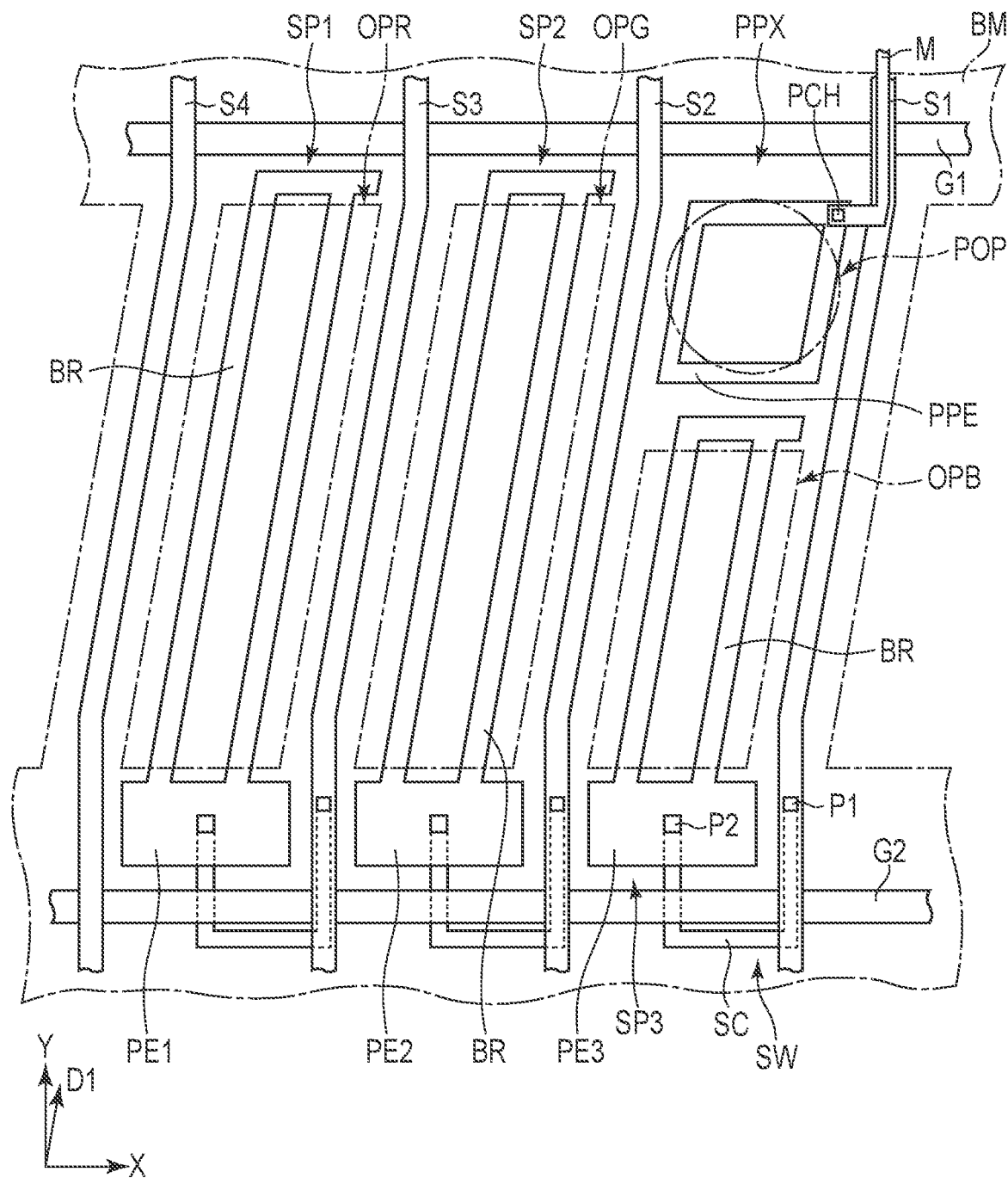
F I G. 9

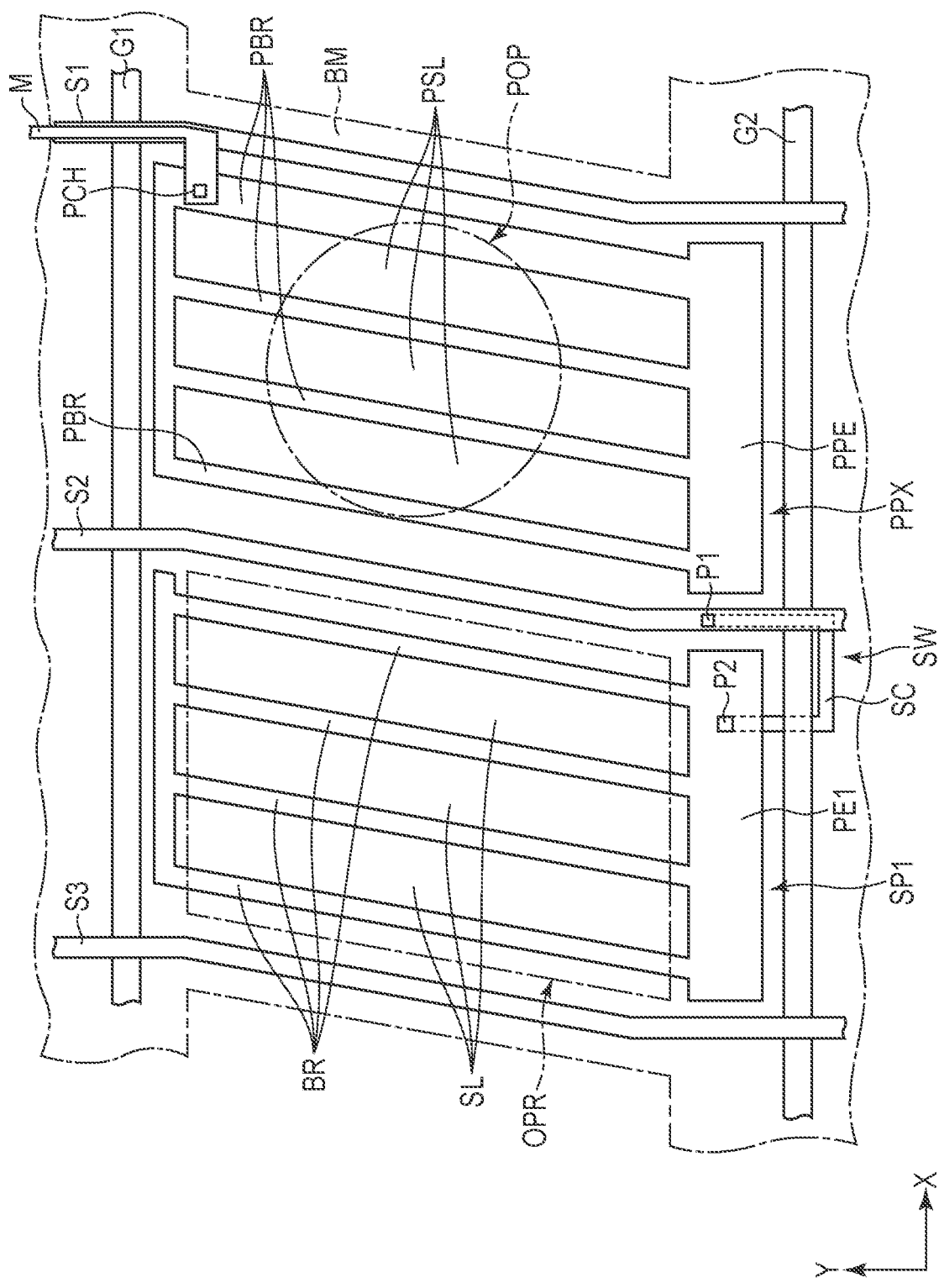
F I G. 11

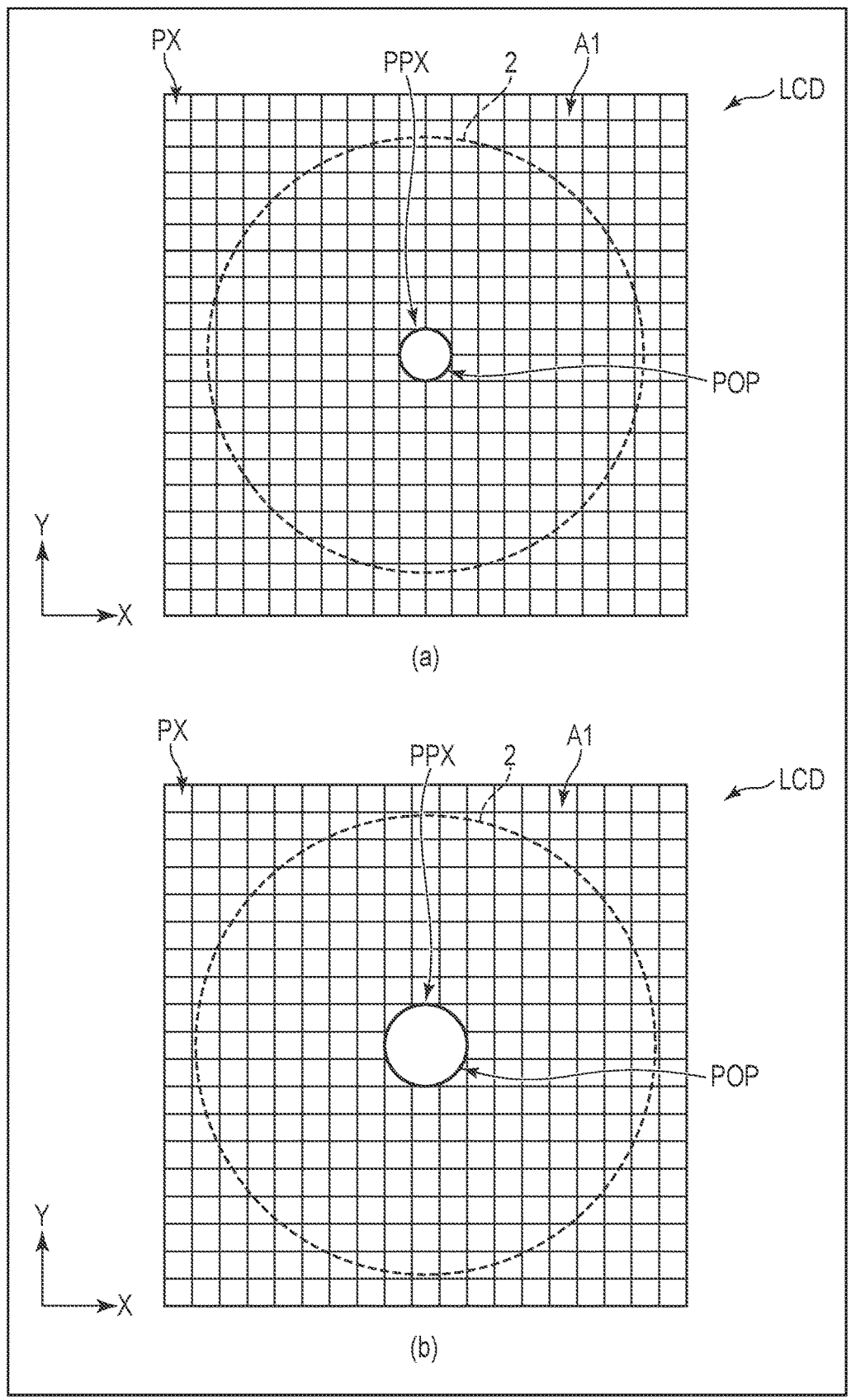
F I G. 13

ELECTRONIC APPARATUS INCORPORATING CAMERA AND DISPLAY DEVICE

CROSS-REFERENCE TO RELATED APPLICATIONS

This application is a Continuation Application of PCT Application No. PCT/JP2019/037714, filed Sep. 25, 2019 and based upon and claiming the benefit of priority from Japanese Patent Application No. 2018-239923, filed Dec. 21, 2018, the entire contents of all of which are incorporated herein by reference.

FIELD

Embodiments described herein relate generally to an electronic apparatus incorporating a camera and a display device.

BACKGROUND

In recent years, electronic apparatuses such as smartphones, which are equipped with a display portion and a camera on the same surface side have been widely put into practical use. In such an electronic apparatus, the camera is provided on an outer side of the display portion, and therefore there is an increasing demand for reducing the frame width on the outer side of the display portion while securing a space for installing the camera.

Further, there is a demand of being able to take clear pictures.

BRIEF DESCRIPTION OF THE DRAWINGS

FIG. 2 is a cross-sectional view of surroundings of a camera 1 of the electronic apparatus 100 shown in FIG. 1.

FIG. 9 is a plan view showing three subpixels of a pixel PX, and a pixel PPX shown in FIG. 8.

FIG. 11 is a plan view showing a pixel PPX and a subpixel SP1, shown in FIG. 10

FIG. 13 is a plan view showing still another configuration example of the liquid crystal element LCD in the embodiment.

DETAILED DESCRIPTION

Figure 1:
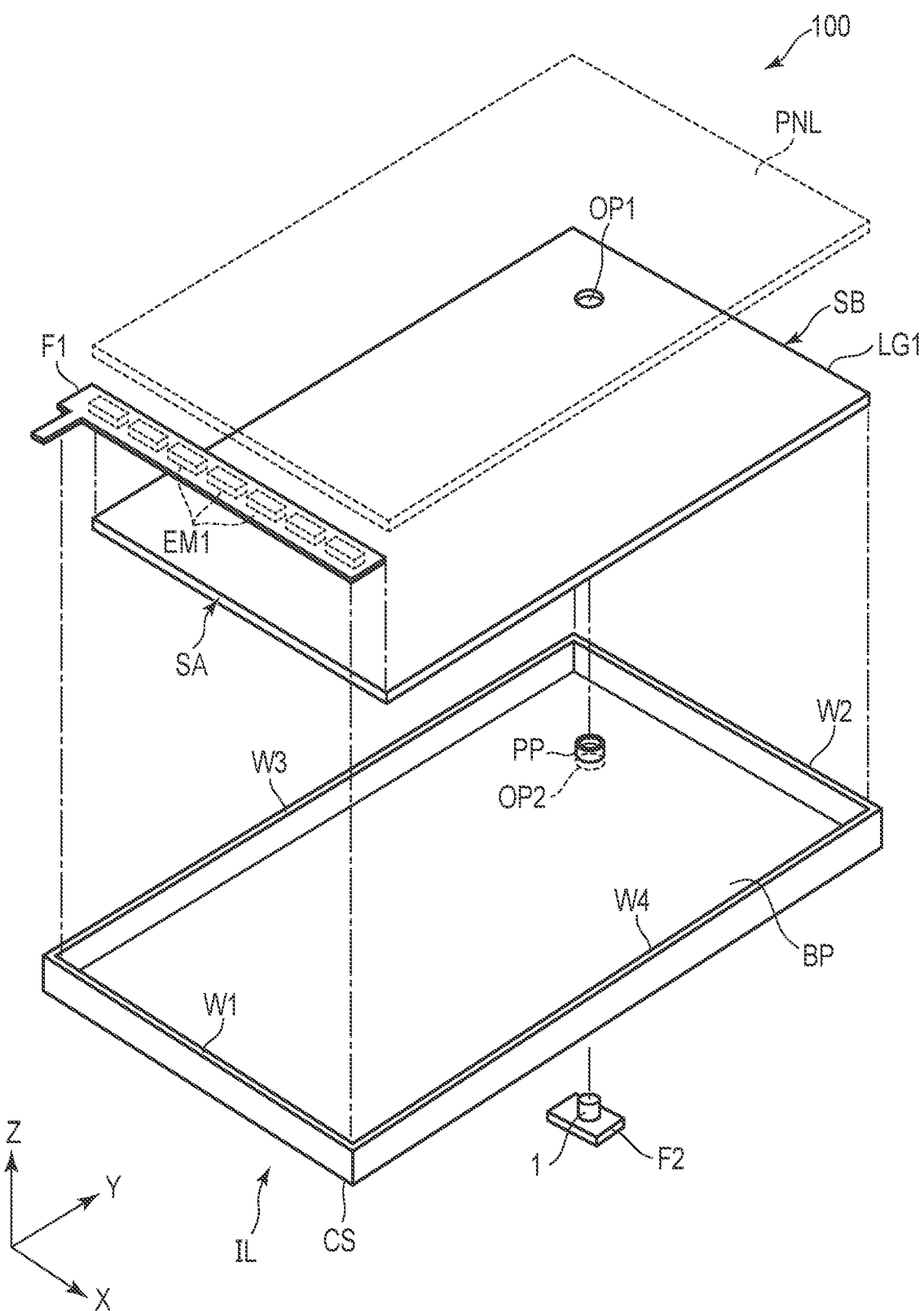
FIG. 1 is an exploded perspective view showing a configuration example of an electronic apparatus 100 of an embodiment.

In general, according to one embodiment, there is provided an electronic apparatus comprising a camera, and a liquid crystal panel comprising a display portion which overlaps the camera. The liquid crystal panel comprises a first transparent electrode which overlaps the camera, and a light-shielding layer comprising a first opening having a circular shape and superposed on the first transparent electrode.

Hereinafter, the present embodiment will be described with reference to the drawings. It should be noted that the disclosure is merely an example, and a person having ordinary skill in the art can easily think of appropriate modifications while keeping the gist of the invention, and are naturally included in the scope of the invention. Further, in order to make the description clearer, the drawings may schematically show the width, thickness, shape, etc., of each part as compared with the actual mode, but this is merely an example, and it does not limit the interpretation. Further, in the present specification and the drawings, constituent elements that exhibit the same or similar functions as those described above with respect to the already-existing drawings are designated by the same reference numerals, and redundant detailed description may be appropriately omitted.

FIG. 1 is an exploded perspective view showing a configuration example of an electronic apparatus 100 of the embodiment.

As shown in FIG. 1, a first direction X, a second direction Y and a third direction Z are orthogonal to each other, but may intersect at an angle other than 90 degrees.

The electronic apparatus 100 comprises a liquid crystal panel PNL, an illumination device IL, and a camera 1.

The illumination device IL comprises a light guide LG1, light sources EM1 and a case CS. The illuminating device IL with such a structure is configured to illuminates the liquid crystal panel PNL, illustrated in a simplified manner by dashed lines in FIG. 1, for example.

The light guide LG1 is formed into a flat plate shape parallel to an X-Y plane defined by the first direction X and the second direction Y. The light guide LG1 opposes the liquid crystal panel PNL in the third direction Z. The light guide LG1 comprises a side surface SA, a side surface SB on an opposite side to the side surface SA and an opening OP1. The side surfaces SA and SB each extend in the first direction X. For example, the side surfaces SA and SB are surfaces parallel to an X-Z plane defined by the first direction X and the third direction Z. The opening OP1 is a through hole that penetrates the light guide LG1 in the third direction Z. The opening OP1 is located between the side surfaces SA and SB in the second direction Y, and is closer to the side surface SB than to the side surface SA. The opening OP1 may be a recess or a notch recessed from the side surface SB toward the side surface SA.

The light sources EM1 are arranged at intervals in the first direction X. Each of the light sources EM1 is mounted on a wiring substrate F1 and electrically connected to the wiring substrate F1. The light sources EM1 each are, for example, a light-emitting diode (LED) and emit white illumination light. The illumination light emitted from the light source EM1 enters the light guide LG1 from the side surface SA, and travels from the side surface SA toward the side surface SB.

The case CS accommodates the light guide LG1 and the light sources EM1. The case CS comprises side walls W1 to W4, a bottom plate BP, an opening OP2 and a protrusion PP.

The side walls W1 and W2 extend in the first direction X and oppose each other. The side walls W3 and W4 extend in the second direction Y and face each other. The opening OP2 overlaps the opening OP1 in the third direction Z. The protrusion PP protrudes from the bottom plate BP toward the liquid crystal panel PNL in the third direction Z, and is provided so as to surround the opening OP2.

The camera 1 is provided so as to overlap the opening OP2 in the third direction Z. The camera 1 is mounted on a wiring substrate F2 and electrically connected to the wiring substrate F2.

The liquid crystal panel PNL is overlaid on the light guide LG1, and overlaps the camera 1 at the opening OP1.

FIG. 2 is a cross-sectional view of the surrounding of the camera 1 of the electronic apparatus 100 shown in FIG. 1.

As shown in FIG. 2, the illumination device IL further comprises a reflective sheet RS, a diffusion sheet SS, and prism sheets PS1 and PS2.

The reflective sheet RS, the light guide LG1, the diffusion sheet SS, the prism sheet PS1, and the prism sheet PS2 are arranged in this order in the third direction Z and accommodated in the case CS. The case CS comprises a metal-made case CS1 and a resin-made base CS2. The base CS2 and the case CS1 form a protrusion PP. Each of the diffusion sheet SS, the prism sheet PS1 and the prism sheet PS2 comprises a through hole that overlaps the opening OP1. The reflective sheet RS comprises a through hole that overlaps the opening OP1. The protrusion PP is located on an inner side of the opening OP1.

A polarizer PL1, the liquid crystal panel PNL, a polarizer PL2 and a cover glass CG are arranged in this order in the third direction Z so as to constitute a liquid crystal element LCD which has an optical switch function for the light traveling in the third direction Z. An adhesive tape TP1 adheres the illumination device IL and the liquid crystal element LCD together. In this embodiment, the adhesive tape TP1 adheres the polarizer PL1 and the protrusion PP together, and the polarizer PL1 and the prism sheet PS2 together.

The liquid crystal panel PNL may be provided for any of structure for a display mode using a lateral electric field along the main surface of the substrate, a display mode using a vertical electric field along a normal line of the main surface of the substrate, and an inclined electric field inclined in an oblique direction with respect to the main surface of the substrate. Further, it may have a structure provided for a display mode which uses the lateral electric field, vertical electric field, and oblique electric field in an appropriate combination. Here, the main surface of the substrate is a surface parallel to the X-Y plane.

The liquid crystal panel PNL comprises a display portion DA that displays images and a non-display portion NDA that surrounds the display portion DA. The liquid crystal panel PNL comprises a first substrate SUB1, a second substrate SUB2, a liquid crystal layer LC, and a sealant SE. The sealant SE is located in the non-display portion NDA, adheres the first substrate SUB1 and the second substrate SUB2 together, and seals the liquid crystal layer LC.

Hereinafter, the main portions of the first substrate SUB1 and the second substrate SUB2 will be described. The first substrate SUB1 comprises an insulating substrate 10 and an alignment film AL1. The second substrate SUB2 comprises an insulating substrate 20, a color filter CF, a light-shielding layer BMA, a transparent layer OC and an alignment film AL2.

The insulating substrate 10 and the insulating substrate 20 are transparent substrates such as glass substrates and flexible resin substrates. The alignment films AL1 and AL2 are in contact with the liquid crystal layer LC.

The color filter CF, the light-shielding layer BMA and the transparent layer OC are located between the insulating substrate 20 and the liquid crystal layer LC. Note that in the example illustrated, the color filter CF is provided on the second substrate SUB2, but it may be provided on the first substrate SUB1.

The light-shielding layer BMA is located in the non-display portion NDA. A boundary L between the display portion DA and the non-display portion NDA is defined by, for example, an inner end of the light-shielding layer BMA (an end portion on the display portion DA side). The sealant SE is provided at a position overlapping the light-shielding layer BMA.

The transparent layer OC is in contact with the color filter CF in the display portion DA and in contact with the light-shielding layer BMA in the non-display portion NDA. The alignment films AL1 and AL2 are provided over the display portion DA and the non-display portion NDA.

Although details of the color filter CF are omitted here, the color filter CF comprises, for example, a red colored filter disposed in a red pixel, a green colored filter disposed in a green pixel and a blue colored filter disposed in a blue pixel. The color filter CF may further comprise a transparent resin layer disposed in a white pixel. The transparent layer OC covers the color filter CF and the light-shielding layer BMA. The transparent layer OC is, for example, a transparent organic insulating layer.

The camera 1 is provided so as to overlap the opening OP2 of the case CS and is located on an inner side of the protrusion PP. The camera 1 overlaps the cover glass CG, the polarizer PL2, the liquid crystal panel PNL, and the polarizer PL1 in the third direction Z. Note that a part or all of the camera 1 overlaps the display portion DA of the liquid crystal panel PNL in the third direction Z. That is, in the electronic apparatus 100 comprising the liquid crystal panel PNL and the camera 1, it suffices if the camera 1 is provided on a back side of the liquid crystal panel PNL as viewed from the user of the electronic apparatus 100.

The camera 1 comprises, for example, an optical system 2 including at least one lens, an image sensor (an image pickup element) 3 and a case 4. The case 4 accommodates the optical system 2 and the image sensor 3. The optical system 2 is located between the liquid crystal panel PNL and the image sensor 3. The image sensor 3 receives light through the cover glass CG, the polarizer PL2, the liquid crystal panel PNL and the polarizer PL1. For example, the camera 1 receives visible light (for example, light in a range of 400 nm to 700 nm) transmitted through the cover glass CG, the polarizer PL2, the display portion DA, the polarizer PL1, and the light guide LG2. In the case where an absorption axis of the polarizer PL1 and an absorption axis of the polarizer PL2 are orthogonal to each other, when retardation of the liquid crystal layer LC is equivalent to substantially zero or $\lambda$, where $\lambda$ is the wavelength of light transmitted through the liquid crystal layer LC of the liquid crystal element LCD, transmittance of the liquid crystal element LCD is minimized. Therefore, when shooting with the camera 1, the retardation of the liquid crystal layer LC is set to be greater than zero but less than $\lambda$. When the retardation is about $\lambda/2$, the transmittance of the liquid crystal element LCD is maximized.

The polarizer PL1 is adhered to the insulating substrate 10. The polarizer PL2 is adhered to the insulating substrate 20. The polarizer PL2 is adhered to the cover glass CG by a transparent adhesive layer AD. The polarizers PL1 and PL2 may include a retardation film, a scattering layer, an antireflective layer or the like, if necessary.

Further, in order to prevent the liquid crystal layer LC from being affected by an external electric field or the like, a transparent conductive film may be provided between the polarizer PL2 and the insulating substrate 20. The transparent conductive film is made of a transparent oxide conductor such as indium tin oxide (ITO) or indium zinc oxide (IZO). A transparent conductive film may be formed at a position overlapping the camera 1 for visible light, where transmittance of infrared is not regarded.

Further, the polarizer PL1 or the polarizer PL2 can be provided with a super birefringent film. It is known that super birefringent films depolarize transmitted light (into natural light) when linearly polarized light enters, and thus it is possible to pick up images without feeling a sense of unnaturalness even if the subject includes a matter that emits polarized light. For example, when the electronic apparatus 100 or the like is reflected in the subject of the camera 1, the user may feel a sense of unnaturalness during shooting for the following reason. That is, since linearly polarized light is emitted from the electronic apparatus 100, the brightness of the electronic apparatus 100 that is made incident on the camera 1 may change depending on the angle between the polarizer PL1 and the polarizer PL2 and the polarizer of the electronic apparatus 100 that is a part of the subject. However, with the super birefringent films provided on the polarizers PL1 and PL2, it is possible to suppress a change in brightness that causes the feeling of unnaturalness.

A preferably used example of the films exhibiting super birefringence is Cosmoshine (registered trademark) manufactured by Toyobo Co., Ltd. Here, the super-birefringence is defined as that the retardation in an in-plane direction with respect to light in a visible range, for example, 500 nm is 800 nm or more.

Figure 3:
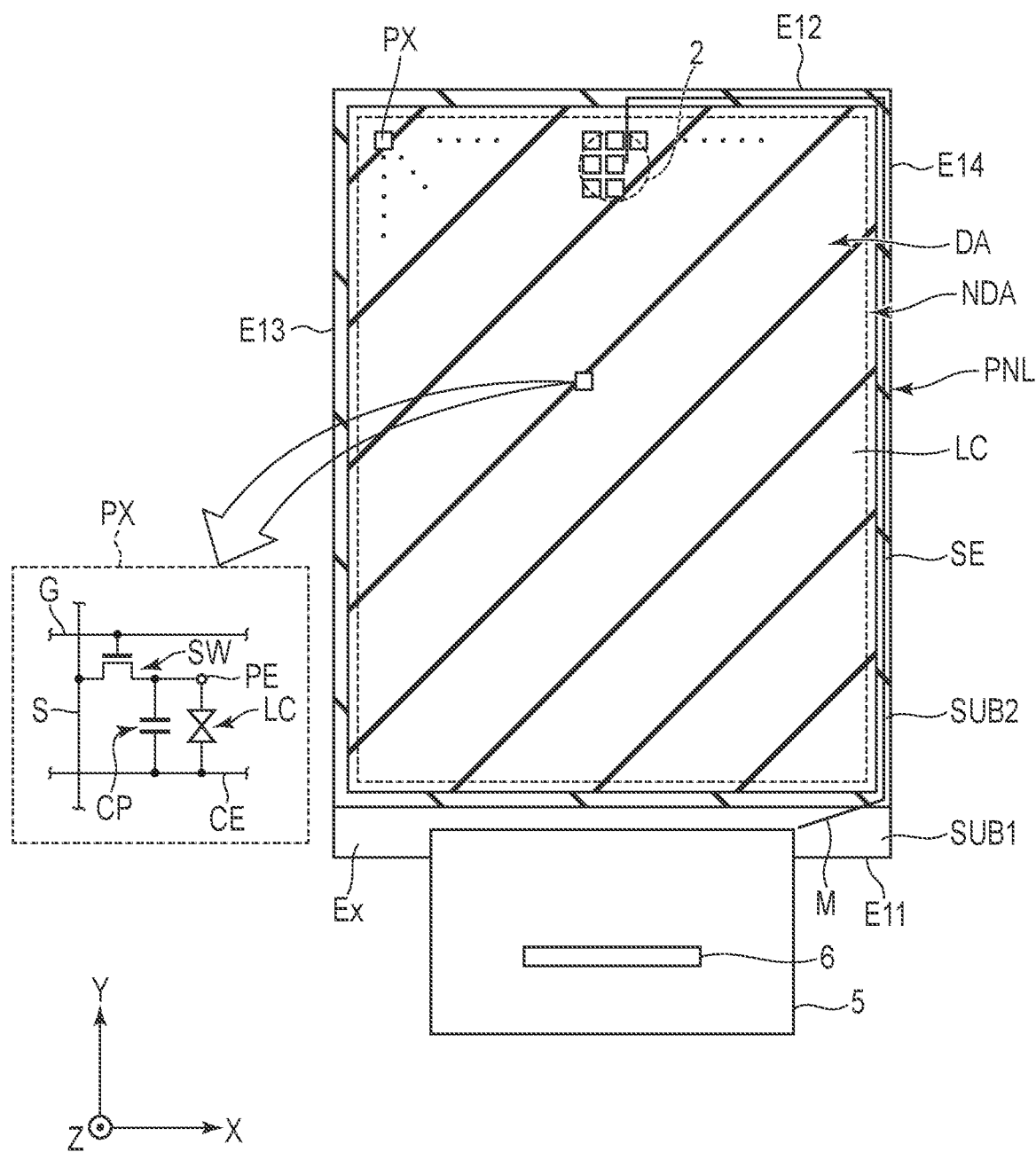
FIG. 3 is a plan view showing a configuration example of a liquid crystal panel PNL shown in FIG. 2.

FIG. 3 is a plan view showing a configuration example of the liquid crystal panel PNL shown in FIG. 2. In FIG. 3, the liquid crystal layer LC and the sealant SE are shown by different hatchings. The outline of the optical system 2 of the camera 1 is shown by a dashed line.

As shown in FIG. 3, the display portion DA is a substantially quadrangular area that does not include a notch, but may have rounded four corners, or may be polygonal other than quadrangular, or circular. The display portion DA is located on an inner side surrounded by the sealant SE.

The liquid crystal panel PNL includes a pair of short sides E11 and E12 extending in the first direction X and a pair of long sides E13 and E14 extending in the second direction Y. The liquid crystal panel PNL comprises a plurality of pixels PX arranged in a matrix in the first direction X and the second direction Y in the display portion DA. Each pixel PX in the display portion DA has the same circuit configuration. As enlarged in FIG. 3, each pixel PX comprises a switching element SW, a pixel electrode PE, a common electrode CE, a liquid crystal layer LC and the like. The switching element SW is constituted by, for example, a TFT (thin film transistor), and is electrically connected to the respective scanning line G and the respective signal line S. A control signal for controlling the switching element SW is supplied to the scanning line G. A video signal, which is a signal different from the control signal, is supplied to the signal line S. The pixel electrode PE is electrically connected to the switching element SW. The liquid crystal layer LC is driven by an electric field generated between the pixel electrode PE and the common electrode CE. The capacitor CP is formed, for example, between an electrode having the same potential as that of the common electrode CE and an electrode having the same potential as that of the pixel electrode PE.

The wiring substrate 5 is mounted on an extended portion Ex of the first substrate SUB1 and electrically connected thereto. An IC chip 6 is mounted on the wiring substrate 5 and electrically connected to the wiring substrate 5. Note that the IC chip 6 may be mounted on the extended portion Ex and electrically connected to the extended portion Ex. The IC chip 6 contains, for example, a display driver that outputs a signal necessary for image display. The wiring substrate 5 is a foldable flexible printed circuit.

In the first substrate SUB1, a metal wiring line M is electrically connected to the IC chip 6. The metal wiring line M extends between the display portion DA and the short side E11, between the display portion DA and the long side E14, and between the display portion DA and the short side E12, and overlaps the optical system 2. In the illustrated example, the sealant SE is superposed on the metal wiring line M.

Figure 4:
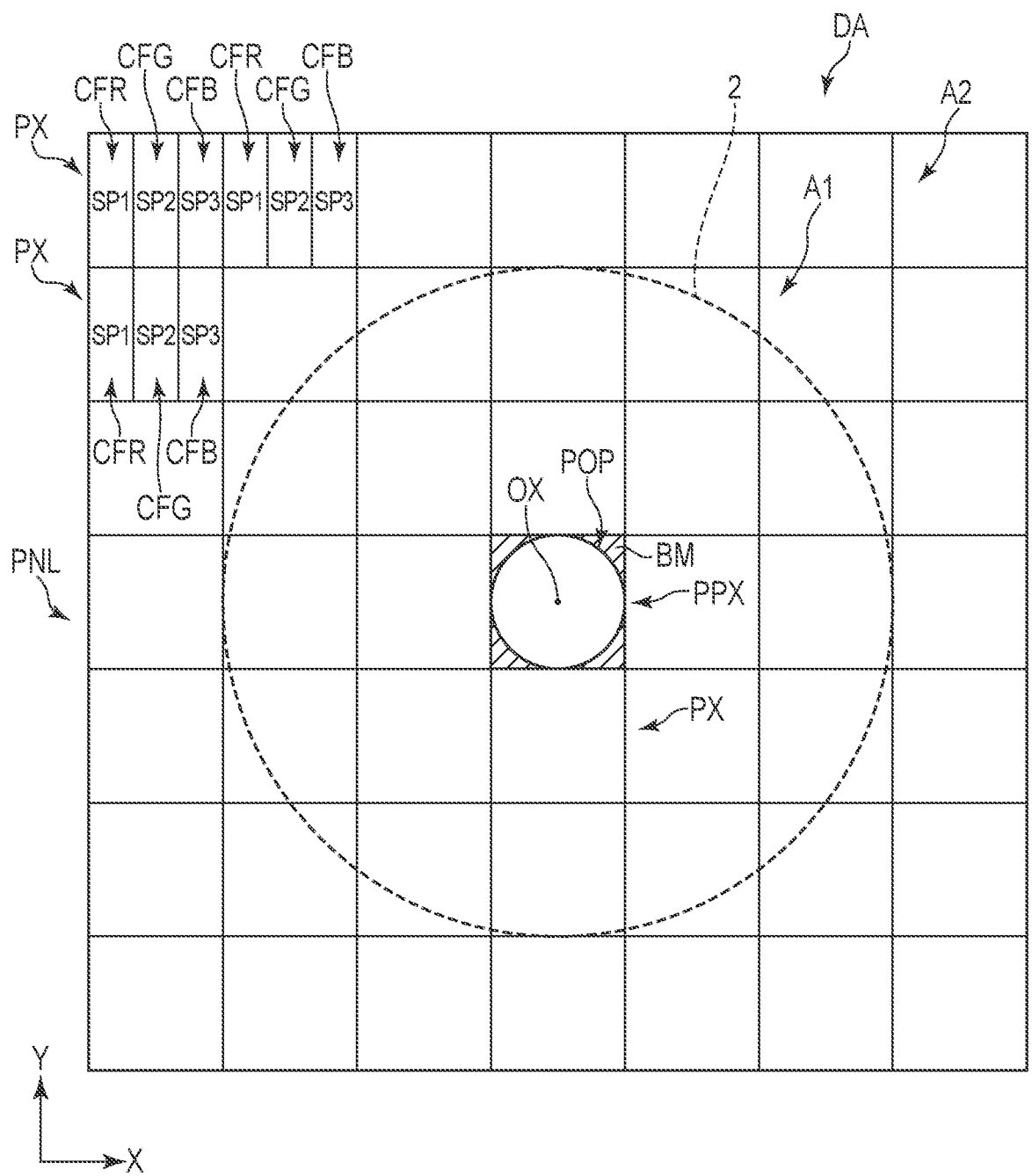
FIG. 4 is an enlarged plan view of the liquid crystal panel PNL shown in FIG. 3.

FIG. 4 is an enlarged plan view of the liquid crystal panel PNL shown in FIG. 3.

As shown in FIG. 4, the display portion DA includes an area A1 which overlaps the optical system 2 and an area A2 other than the area A1. The area A1 is an area which overlaps at least the camera 1 shown in FIG. 1. In the illustrated example, the number of pixels PX in the area A1 is 5×5.

The pixels PX are disposed in an area of the area A1, which surrounds the pixel PPX, and the area A2. Each of the pixels PX includes subpixels SP1 to SP3. In any of the pixels PX, the subpixel SP1, the subpixel SP2, and the subpixel SP3 are similarly arranged. In the first direction X, the subpixel SP1, the subpixel SP2, and the subpixel SP3 are arranged in this order repeatedly.

The color filter CF includes colored layers CFR, CFG and CFB. The subpixel SP1 comprises a colored layer CFR of a first color. The sub-pixel SP2 comprises a colored layer CFG of a second color. The subpixel SP3 comprises a colored layer CFB of a third color. The first-color colored layer CFR, the second-color colored layer CFG, and the third-color colored layer CFB are of colors different from each other. In this embodiment, the first color is red (R), the second color is green (G), and the third color is blue (B). But, the first color, the second color, and the third color are shown as examples and can be variously modified. It is sufficient if, of the first color, the second color and the third color, any one is red, another is green, and the remaining one is blue. Further, some of the third color layers may be, for example, white (W).

The pixel PPX is arranged in the area A1 and superposed on a center OX of the optical system 2. The pixel PPX is configured to be without a colored layer. Note that when the color filter CF includes a transparent resin layer, the pixel PPX may comprise a transparent resin layer in place of the colored layer. The pixel PPX and a plurality of pixels PX are arranged in a matrix in the first direction X and the second direction Y. In the illustrated example, the pixel PPX is disposed side by side to one pixel PX in each of the first direction X and the second direction Y.

The light-shielding layer BM is superposed on the pixel PPX. In FIG. 4, the illustration of the light-shielding layer BM that overlaps the pixels PX other than the pixel PPX is omitted. The light-shielding layer BM is formed to be integrated as one body with the light-shielding layer BMA of the non-display portion NDA shown in FIG. 2. The light-shielding layer BM comprises an opening POP. In the illustrated example, a center of the opening POP is superposed on the center OX of the optical system 2. In plan view, the opening POP and the optical system 2 are concentric circles. The opening POP is formed into a circular shape. It is preferable that the opening POP be formed into a perfect circle.

Note that the pixel PPX may not be used for display, and thus in a strict sense, it cannot be called a pixel; however, it is called a pixel as in the case of the pixels which contribute to display. Further, an electrode comprising the same transparent conductive film, and an opening formed in the same light-shielding layer BM, even though it does not comprise the transparent conductive film, as well are called pixels in this specification.

Here, let us focus on comparison in size between the optical system 2 and the opening POP of the pixel PPX in relation to each other.

In the illustrated example, the diameter of the optical system 2 is approximately five times a width of the pixel PX. In the embodiment, a width is defined as a length in the first direction X. The width of the pixel PPX is substantially the same as the width of the pixel PX. The diameter of the opening POP and the width of the pixel PPX are substantially equal to each other. That is, the diameter of the optical system 2 is equivalent to approximately five times the diameter of the opening POP. For example, the diameter of the optical system 2 is approximately 3000 μm, and the diameter of the opening POP is approximately 600 μm.

Figure 5:
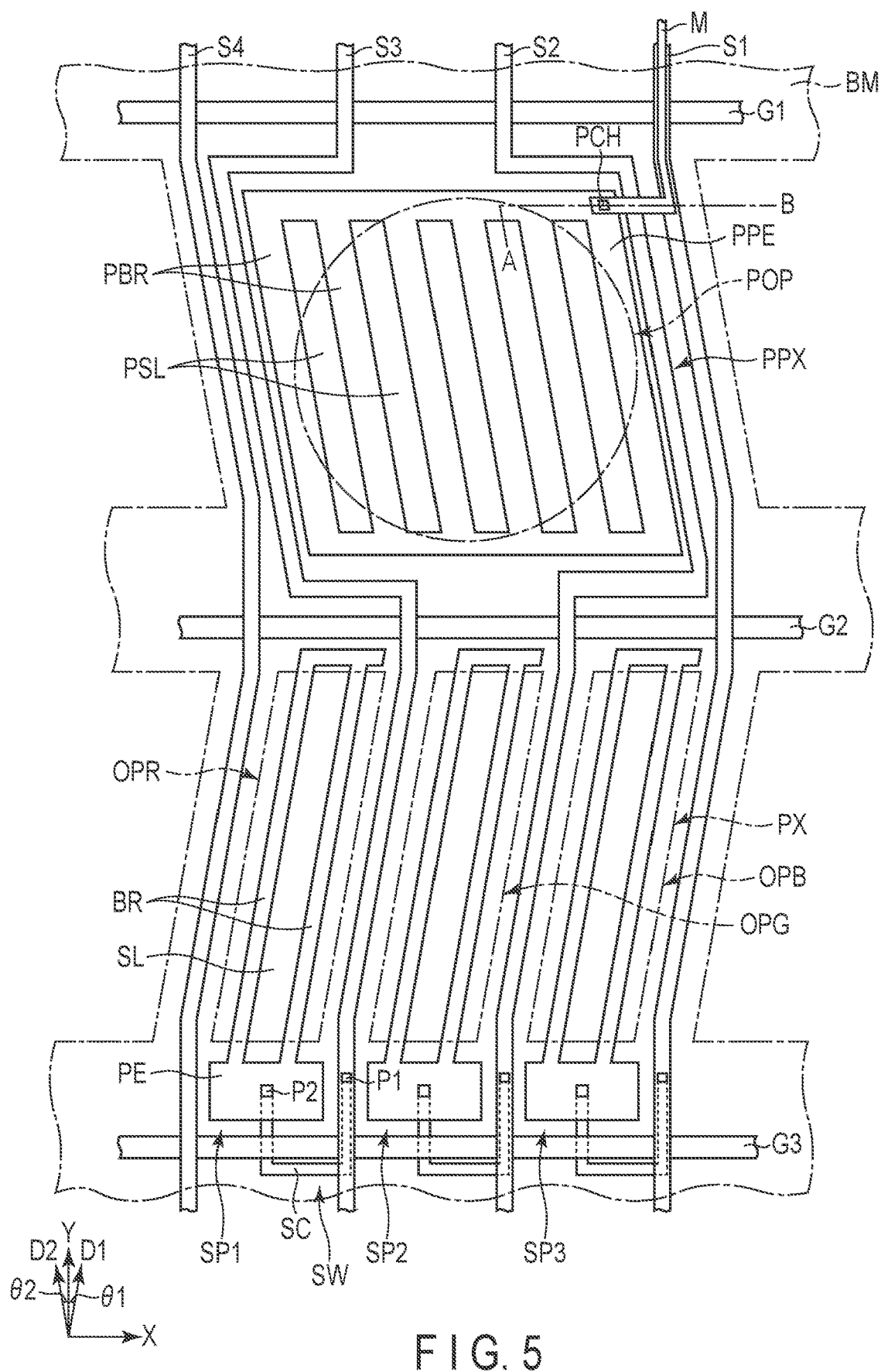
FIG. 5 is an enlarged plan view of two pixels shown in FIG. 4.

FIG. 5 is an enlarged plan view of the pixel PPX and a pixel PX adjacent to the pixel PPX shown in FIG. 4.

As shown in FIG. 5, a direction that intersects the second direction Y at an acute angle in the clockwise direction is defined as a direction D1, and a direction that intersects the second direction Y at an acute angle in the counterclockwise direction is defined as a direction D2. Note that an angle θ1 formed by the second direction Y and the direction D1 is substantially the same as an angle θ2 formed by the second direction Y and the direction D2.

The scanning lines G1 to G3 each extend in the first direction X and are arranged side by side in the second direction Y at intervals. The signal lines S1 to S4 each extend in the second direction Y and are arranged side by side in the first direction X at intervals. The scanning lines G and the signal lines S intersect each other. The scanning lines G and the signal lines S are made of a metal material such as aluminum (Al), titanium (Ti), silver (Ag), molybdenum (Mo), tungsten (W), copper (Cu), chromium (Cr) or the like, or an alloy formed by combining any of these metal materials. Each of the scanning lines G and the signal lines S may be of a single-layered or a multilayered structure. Note that the scanning lines G and the signal lines S may not necessarily extend linearly, or some may be bent. For example, it is assumed that the signal line S extend in the second direction Y even if some thereof are bent.

The pixel PX is located between the scanning lines G2 and G3 and between the signal lines S1 and S4. In each subpixel SP, the semiconductor layer SC intersects the respective scanning line G twice, and the switching element SW is constituted by a thin film transistor (TFT) of a double gate structure. Note that the switching element SW may be constituted by a TFT of a single gate structure in which the semiconductor layer SC intersects the respective scanning line G once. The semiconductor layer SC is connected to the respective signal line S at a connection position P1 and connected to the respective pixel electrode PE at a connection position P2. At the connection position P2, a relay electrode is interposed between the pixel electrode PE and the semiconductor layer SC, but the illustration of the relay electrode is omitted from FIG. 5. The pixel electrode PE comprises a plurality of linear electrodes BR and slits SL each located between each adjacent pair of linear electrodes BR. In the illustrated example, the linear electrodes BR extend in the direction D1. Here, the pixel electrode PE comprises two linear electrodes BR and one slit SL, but the numbers of the linear electrodes BR and slits SL are not limited to those of this example. Each subpixel SP comprises a switching element SW and a pixel electrode PE, and is controlled by a signal line S and a scanning line G to which the semiconductor layer SC is connected. For example, the subpixel SP1 is controlled by the scanning line G3 and the signal line S3, the subpixel SP2 is controlled by the scanning line G3 and the signal line S2, and the subpixel SP3 is controlled by the scanning line G3 and the signal line S1.

The pixel PPX is located between the scanning lines G1 and G2 and between the signal lines S1 and S4. The pixel PPX comprises a transparent electrode PPE. The transparent electrode PPE includes has a plurality of linear electrodes PBR and slits PSL. In the illustrated example, the linear electrodes PBR extend in the direction D2. Here, the transparent electrode PPE includes six linear electrodes PBR and five slits PSL, but the numbers of linear electrodes PBR and slits PSL are not limited to those of this example. In plan view, the signal line S2 extends between the transparent electrode PPE and the scanning line G1, between the transparent electrode PPE and the signal line S1, and between the transparent electrode PPE and the scanning line G2. In plan view, the signal line S3 extends between the transparent electrode PPE and the scanning line G1, between the transparent electrode PPE and the signal line S4, and between the transparent electrode PPE and the scanning line G2. The signal lines S2 and S3 extend while detouring around the opening POP. In this embodiment, the signal lines S2 and S3 are away from the transparent electrode PPE in plan view. The metal wiring line M is superposed on the signal line S1 and extends along the signal line S1. The metal wiring line M intersects the signal line S2 in plan view and is connected to the transparent electrode PPE through a contact hole PCH. The transparent electrode PPE is not connected to the scanning line G and the signal line S. The pixel PPX is controlled by the metal wiring line M.

The light-shielding layer BM is superimposed on the scanning lines G1 to G3, the signal lines S1 to S4, and the semiconductor layers SC of the subpixels SP. The light-shielding layer BM comprises an opening OPR, an opening OPG and an opening OPB. The opening OPR is located in the subpixel SP1, the opening OPG is located in the subpixel SP2, and the opening OPB is located in the subpixel SP3. Note that the first-color colored layer CFR shown in FIG. 4 overlaps the opening OPR, the second-color colored layer CFG overlaps the opening OPG, and the third-color colored layer CFB overlaps the opening OPB. The opening POP of the light-shielding layer BM overlaps the transparent electrode PPE.

Figure 6:
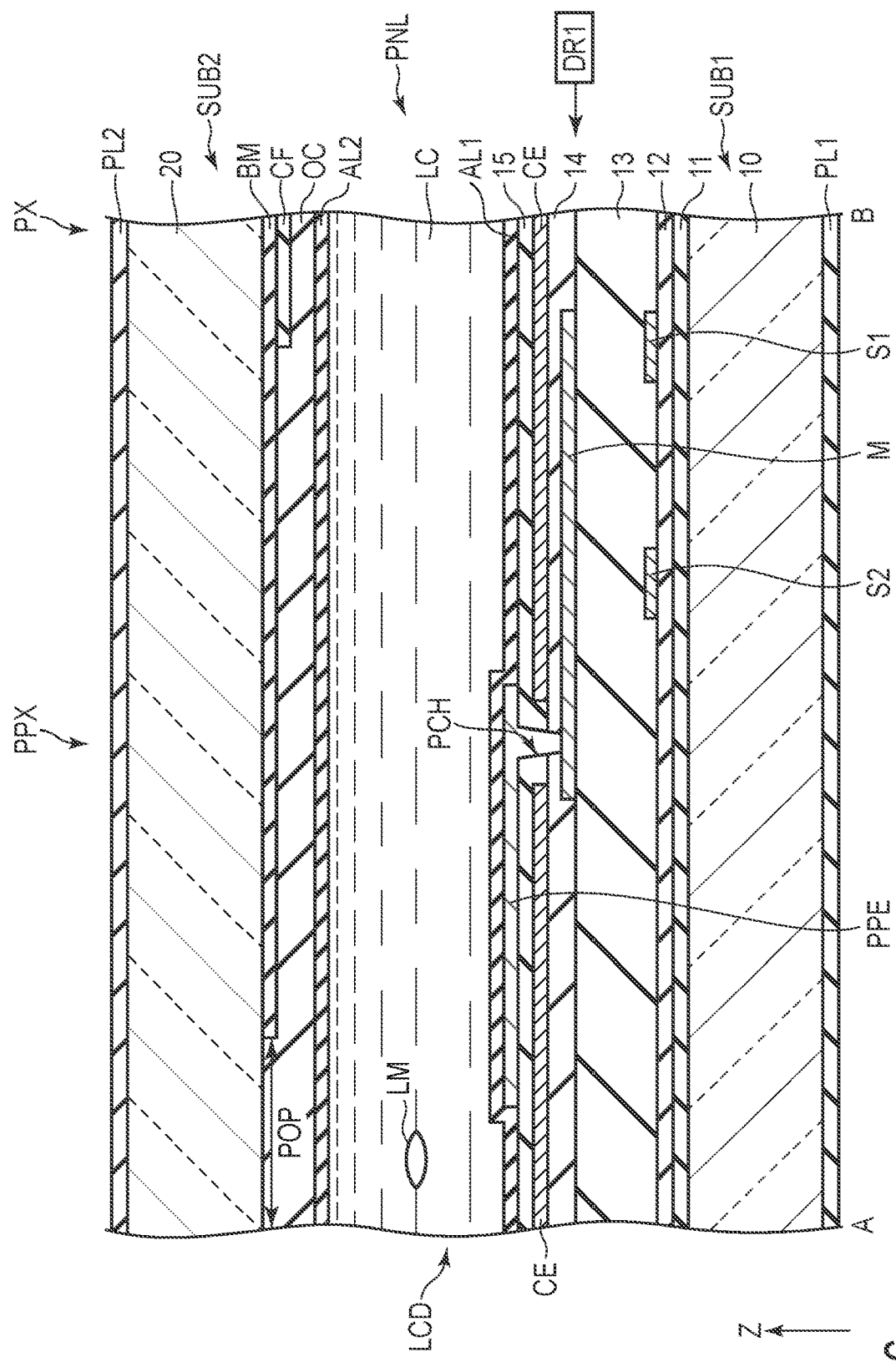
FIG. 6 is a cross-sectional view of the liquid crystal element LCD taken along line A-B shown in FIG. 5.

FIG. 6 is a cross-sectional view of the liquid crystal element LCD taken along line A-B shown in FIG. 5. Here, the liquid crystal element LCD which comprises a liquid crystal panel PNL corresponding to the display mode utilizing a lateral electric field, between the polarizers PL1 and PL2 will be described.

As shown in FIG. 6, the first substrate SUB1 comprises insulating layers 11 to 15, signal lines S1 and S2, a common electrode CE, a metal wiring line M, and a transparent electrode PPE between the insulating substrate 10 and the alignment film AL1. The insulating layer 11 is located on the insulating substrate 10. The insulating layer 12 is located on the insulating layer 11. Note that the scanning line G and the semiconductor layer SC shown in FIG. 5 are located, for example, between the insulating substrate 10 and the insulating layer 11 or between the insulating layer 11 and the insulating layer 12. The signal lines S1 and S2 are located on the insulating layer 12 and covered by the insulating layer 13. The metal wiring line M is located on the insulating layer 13 and covered by the insulating layer 14. The common electrode CE is located on the insulating layer 14 and covered by the insulating layer 15. The transparent electrode PPE is located on the insulating layer 15 and covered by the alignment film AL1. The contact hole PCH penetrates the insulating layers 14 and 15. The transparent electrode PPE opposes the common electrode CE through the insulating layer 15. The common electrode CE and the transparent electrode PPE are transparent electrodes each formed of a transparent conductive material such as ITO or IZO.

In the second substrate SUB2, the light-shielding layer BM is located directly above the metal wiring line M and directly above the transparent electrode PPE. The color filter CF is located directly above the signal line S1. In the pixel PPX, the light-shielding layer BM is in contact with the transparent layer OC, and in the pixel PX, the light-shielding layer BM is in contact with the color filter CF. The insulating substrate 20 is in contact with the transparent layer 20 at the opening POP.

The driver DR1 applies a voltage to the metal wiring line M to control the transmittance of the pixel PPX of the liquid crystal element LCD. The transmittance of the liquid crystal element LCD is controlled according to the magnitude of the voltage applied to the liquid crystal layer LC.

For example, in the pixel PPX, at an OFF state, when no voltage is applied to the liquid crystal layer LC via the metal wiring line M, liquid crystal molecules LM contained in the liquid crystal layer LC are initially aligned in a predetermined direction between the alignment films AL1 and AL2. In this state, the pixel PPX is at the minimum transmittance and displays black. That is, the liquid crystal element LCD exhibits a light-shielding function in the pixel PPX.

On the other hand, at an ON state where a voltage is applied to the liquid crystal layer LC via the metal wiring line M, the liquid crystal molecules LM are aligned in a direction different from the initial alignment direction due to the electric field formed between the transparent electrode PPE and the common electrode CE, and its alignment direction is controlled by the electric field. The liquid crystal element LCD displays white or is in a transparent state at the maximum transmittance when the pixel PPX is in the ON state. That is, the liquid crystal element LCD exhibits a light-transmitting function in the pixel PPX.

Figure 7:
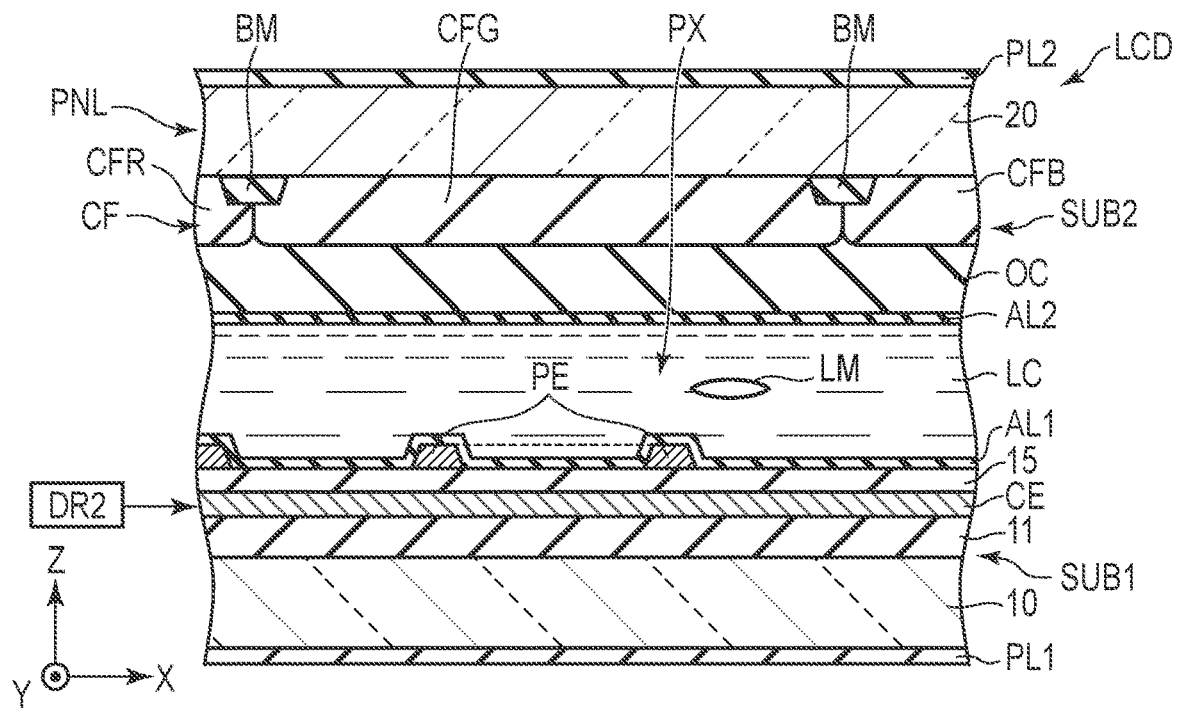
FIG. 7 is a cross-sectional view of a liquid crystal element LCD including a pixel PX, shown in FIG. 5.

FIG. 7 is a cross-sectional view of the liquid crystal element LCD including the pixel PX shown in FIG. 5. Here, the illustration of the insulating layers 12 to 14 and the signal line S is omitted.

As shown in FIG. 7, in the first substrate SUB1, the pixel electrode PE is located on the insulating layer 15 and covered by the alignment film AL1. The pixel electrode PE is a transparent electrode made of a transparent conductive material such as ITO or IZO. In the second substrate SUB2, the second-color colored layer CFG opposes the pixel electrode PE. The first-color colored layer CFR and the third-color colored layer CFB also respectively oppose the other pixel electrodes PE, (not shown).

The driver DR2 that drives the liquid crystal element LCD includes, for example, a scanning line driving circuit electrically connected to the respective scanning line G and a signal line driving circuit electrically connected to the respective signal line S shown in FIG. 3. The driver DR2 outputs a signal necessary for image display to each pixel PX of the display portion DA, and controls the transmittance of the liquid crystal element LCD. In the OFF state where no voltage is applied to the liquid crystal layer LC, the light guided from the light sources EM1 shown in FIG. 1 to the pixel PX is absorbed by the polarizers PL1 and PL2. Therefore, the liquid crystal element LCD displays black in the pixel PX at the OFF state.

On the other hand, in the ON state where the voltage is applied to the liquid crystal layer LC, part of the light guided to the pixel PX passes through the polarizers PL1 and PL2. Therefore, the liquid crystal element LCD displays a color corresponding to the respective color filter CF in the pixel PX at the ON state.

The above-provided example is equivalent to the so-called normally black mode, in which black is displayed in the OFF state, but a normally white mode, in which black is displayed in the ON state (white is displayed in the OFF state) may be applied.

The liquid crystal element LCD with such a structure can function as a pinhole that adjusts the amount of light entering the camera 1 by transmitting the light through the pixel PPX and shielding the light in the other pixels PX overlapping the optical system 2. According to the diameter of the opening POP, the influence by the aberration in the optical system 2 can be reduced and the sharpness can be improved. Further, the focus depth can be increased. When the distance between the camera 1 and a subject is several centimeters, the resolving power of the camera 1 is improved, making it possible to shoot a clear photograph at a close distance to the subject. As an example of photographing of a subject by the camera 1 set close thereto, a fingerprint can be photographed for fingerprint authentication. Further, an infrared camera may also be installed to capture veins.

Furthermore, the diameter of the opening POP is ⅕ of the diameter of the optical system, and therefore the occurrence of blurring due to diffraction can be suppressed as compared to the case where the diameter of the opening POP is less than ⅕ of the diameter of the optical system. Moreover, since the diameter of the opening POP is ⅕ of the diameter of the optical system, the lowering of the sharpness of the camera 1 can be suppressed as compared to the case where the diameter of the opening POP is ⅕ or more of the diameter of the optical system.

Further, by switching the pixel PPX and the plurality of pixels PX (for example, all the pixels PX) in the area A1 to a transmissive state, the camera 1 can take an image with a large amount of light.

In the above-described configuration example, the transparent electrode PPE is equivalent to the first transparent electrode, the opening POP is equivalent to the first opening, and the opening OPR, the opening OPG and the opening OPB are equivalent to the second openings. The pixel PPX is equivalent to the first pixel, the pixels PX are equivalent to the second pixels, the signal line S1 is equivalent to the first signal line, and the signal line S2 is equivalent to the second signal line.

Next, another configuration example of this embodiment will be described.

Figure 8:
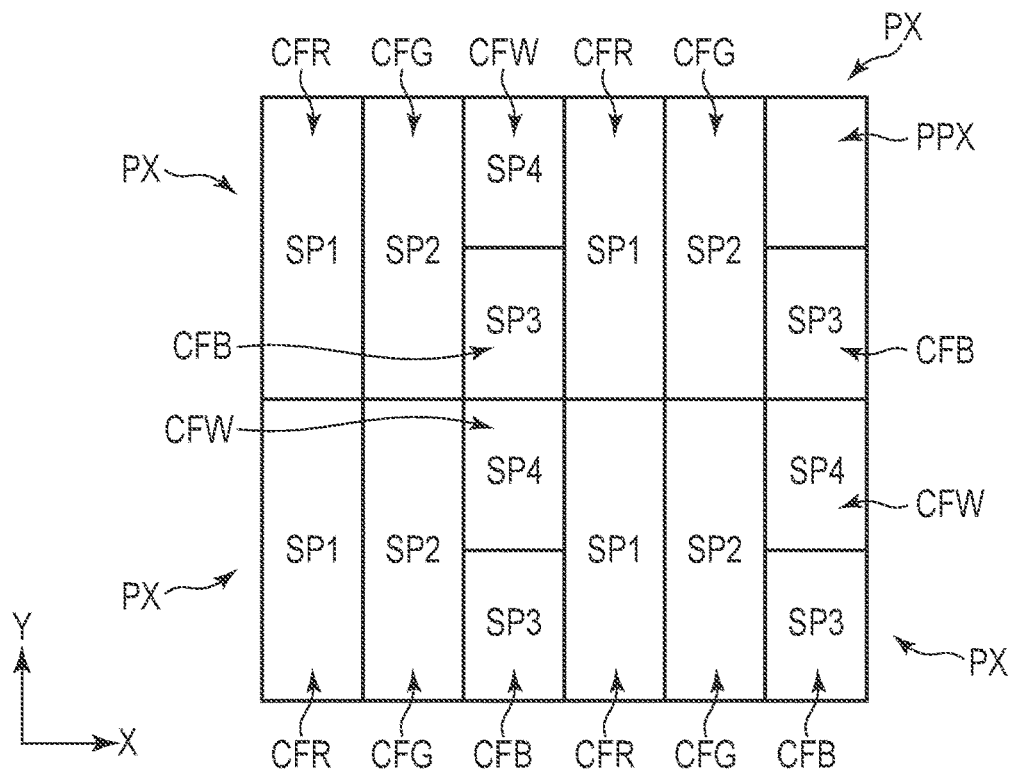
FIG. 8 is a plan view showing another configuration example of a layout of pixels in the embodiment.

FIG. 8 is a plan view showing another configuration example of the pixel layout in this embodiment. The configuration example shown in FIG. 8 is different from that of FIG. 4 in that the pixel PX further comprises a subpixel SP4. The subpixel SP4 is located between the subpixel SP1 and the subpixel SP2, and between the subpixel SP3 and the subpixel SP3. In the second direction Y, the length of the subpixel SP4 is approximately half the length of the subpixel SP1. The subpixel SP4 comprises a transparent resin layer CFW.

In the pixel PX in which the pixel PPX is located, the pixel PX is formed to the include subpixel SP1, the subpixel SP2 and the subpixel SP3, but without subpixel SP4. The pixel PPX occupies the area of the pixel PX, in which the subpixel SP4 is to be originally disposed.

FIG. 9 is a plan view showing the pixel PPX and the three subpixels SP of the pixel PX shown in FIG. 8.

As shown in FIG. 9, the signal lines S1 to S4 each intersect the scanning lines G1 and G2. The subpixel SP1 comprises the pixel electrode PE1, the subpixel SP2 comprises the pixel electrode PE2, and the subpixel SP3 comprises the pixel electrode PE3. The linear electrode BR of the pixel electrode PE3 is shorter than each of the linear electrode BR of the pixel electrode PE1 and the linear electrode BR of the pixel electrode PE2 in the direction D1. The pixel electrodes PE1 to PE3 and the transparent electrode PPE are each located between the scanning line G1 and the scanning line G2. The switching element SW of the subpixel SP3 is electrically connected to the signal line S1 and the scanning line G2, and the pixel electrode PE3 is electrically connected to the switching element SW. The transparent electrode PPE is located between the signal line S1 and the signal line S2, and between the scanning line G1 and the pixel electrode PE3. The pixel electrode PE3 is electrically connected to the switching element SW. The transparent electrode PPE is connected to the metal wiring line M through the contact hole PCH. The transparent electrode PPE is not electrically connected to the scanning lines G1 and G2, and the signal lines S1 to S4.

With such a configuration example, an advantageous effect similar to that of the above-described embodiment can be obtained.

In the above-described configuration example, the scanning line G1 is equivalent to the first scanning line, the scanning line G2 is equivalent to the second scanning line, the signal line S1 is equivalent to the first signal line, the signal line S2 is equivalent to the second signal line, and the pixel electrode PE3 is equivalent to the second transparent electrode.

Figure 10:
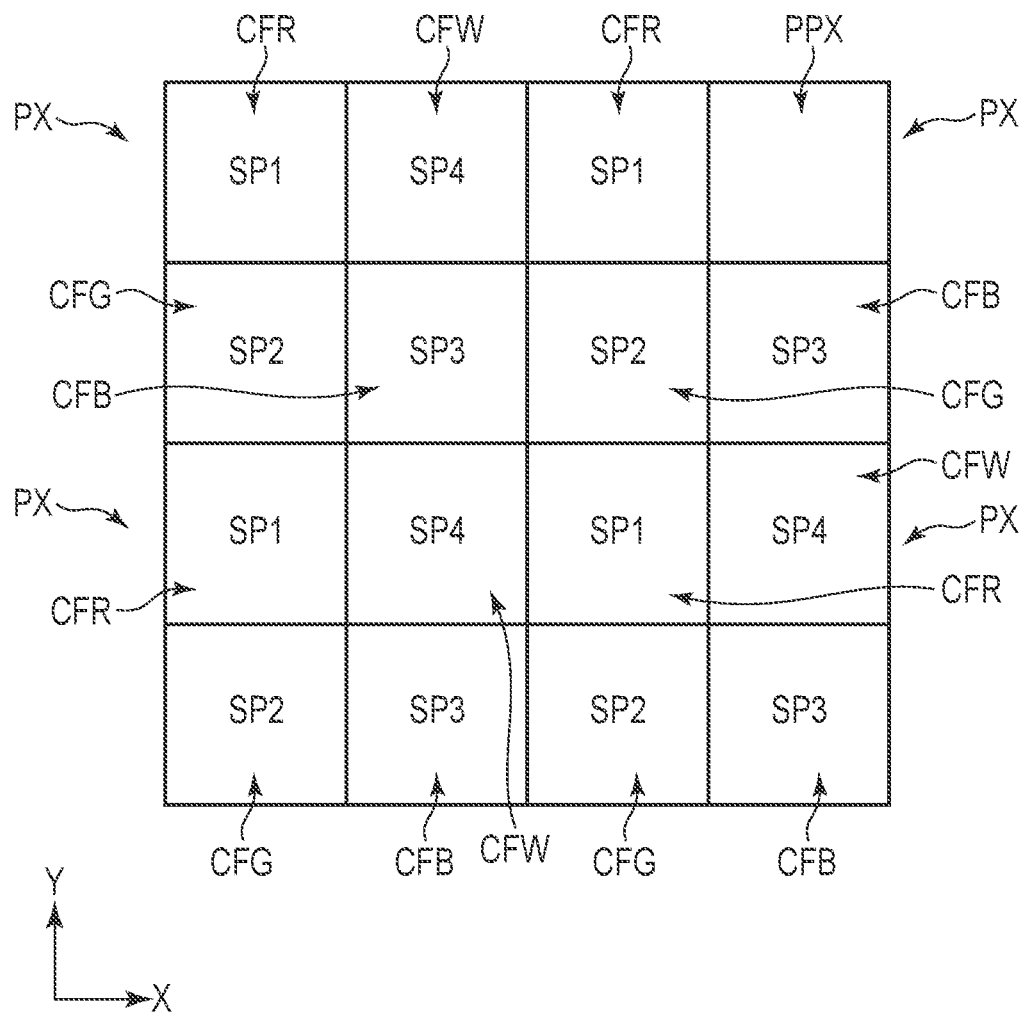
FIG. 10 is a plan view showing another configuration example of the layout of pixels in the embodiment.

FIG. 10 is a plan view showing another configuration example of the pixel layout in the embodiment.

As shown in FIG. 10, in the first direction X, the subpixels SP1 and the subpixels SP4 are repeatedly arranged, while the subpixels SP2 and the subpixels SP3 are repeatedly arranged. In the second direction Y, the subpixels SP1 and the subpixels SP2 are repeatedly arranged, while the subpixels SP3 and the subpixels SP4 are repeatedly arranged. The subpixels SP1 to SP4 are arranged so that subpixels of the same type are not consecutively located in the first direction X and the second direction Y. In the configuration example shown in FIG. 10 as well, in the pixel PX in which the pixel PPX is located, the pixel PX is formed without subpixels SP4. The pixel PPX occupies the area of the pixel PX, where the subpixel SP4 is to be originally disposed.

FIG. 11 is a plan view showing the pixel PPX and the subpixel SP1 shown in FIG. 10

As shown in FIG. 11, the pixel electrode PE1 is located between the signal line S2 and the signal line S3. The transparent electrode PPE is located between the signal line S1 and the signal line S2 and between the scanning line G1 and the scanning line G2. In the illustrated example, the pixel electrode PE1 comprises four linear electrodes BR and three slits SL, and the transparent electrode PPE has four linear electrodes PBR and three slits PSL.

With such a configuration example, an advantageous effect similar to that of the above-described embodiment can be obtained.

Figure 12:
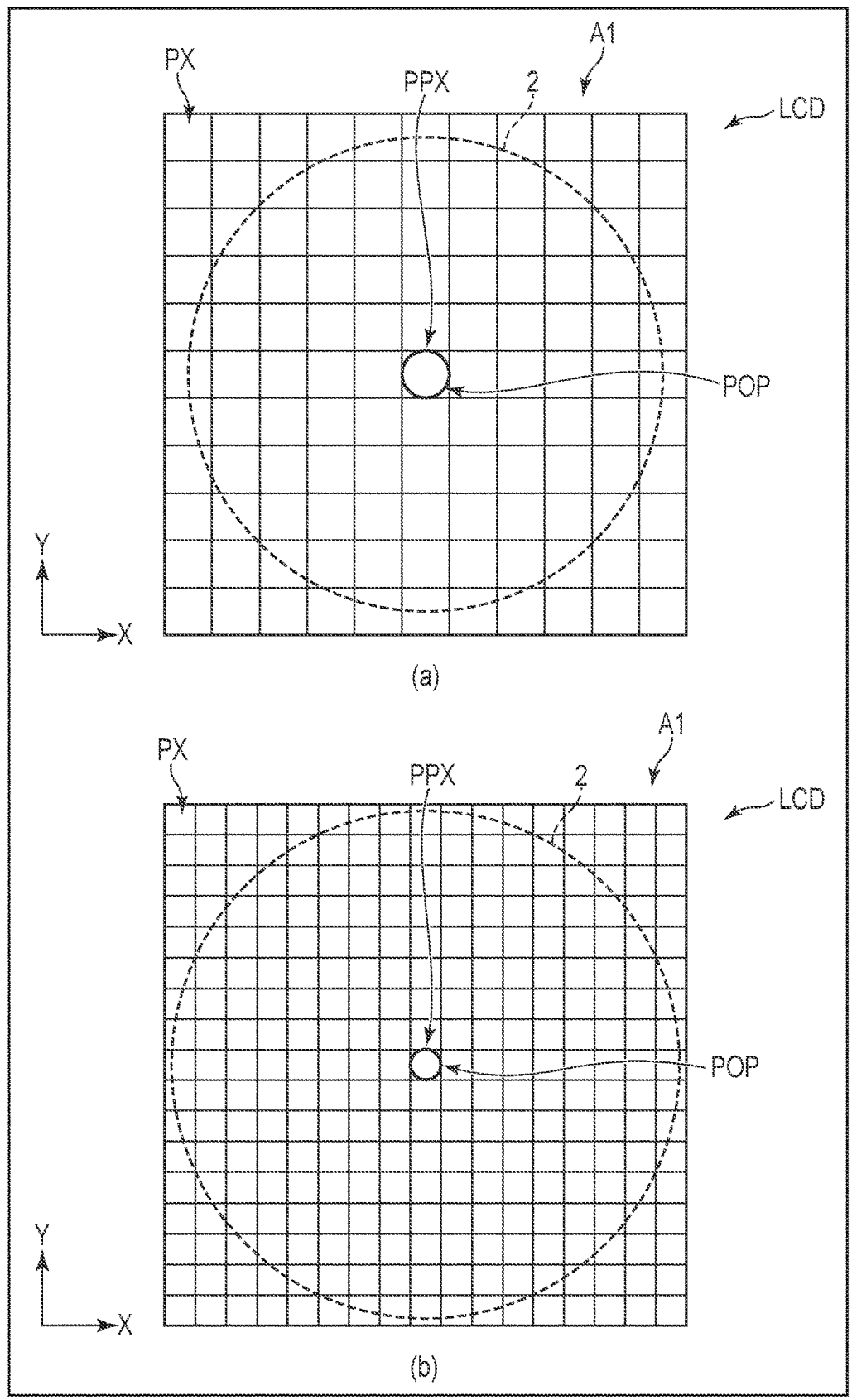
FIG. 12 is a plan view showing another configuration example of the liquid crystal element LCD in this embodiment.

FIG. 12 is a plan view showing another configuration example of the liquid crystal element LCD in this embodiment. In the example shown in FIG. 12, part (a), the number of pixels PX in the area A1 is 11×11. The diameter of the optical system 2 is equivalent to approximately ten times the diameter of the opening POP. For example, the diameter of the opening POP is approximately 300 µm.

In the example shown in FIG. 12, part (b), the number of pixels PX in the area A1 is 17×17. The diameter of the optical system 2 is equivalent to approximately 17 times the diameter of the opening POP. For example, the diameter of the opening POP is approximately 180 µm. In this case, blurring due to diffraction may occur, and therefore it is desirable to shorten the distance from the opening POP to the optical system 2 in the third direction Z so as to avoid dark lines due to diffraction from entering the optical system 2. Alternatively, the intensity distribution of the diffracted light may be prepared to correct the influence by diffraction in the image pickup element 3.

FIG. 13 is a plan view showing another configuration example of the liquid crystal element LCD in this embodiment.

In the example shown in FIG. 13, part (a), the number of pixels PX in the area A1 is 18×18. The width of the pixel PPX is equivalent to approximately twice the width of the pixel PX, and the diameter of the optical system 2 is equivalent to approximately 17 times the width of the pixel PX. For example, the diameter of the opening POP is 360 µm. In the illustrated example, the pixel PPX is placed side by side with two pixels PX in each of the first direction X and the second direction Y.

In the example shown in FIG. 13, part (b), the number of pixels PX in the area A1 is 17×17. The width of the pixel PPX is equivalent to approximately three times the width of the pixel PX. For example, the diameter of the opening POP is 540 µm. In the illustrated example, the pixel PPX is placed side by side with three pixels PX in each of the first direction X and the second direction Y.

With such a configuration example, an advantageous effect similar to that of the above-described embodiment can be obtained.

Figure 14:
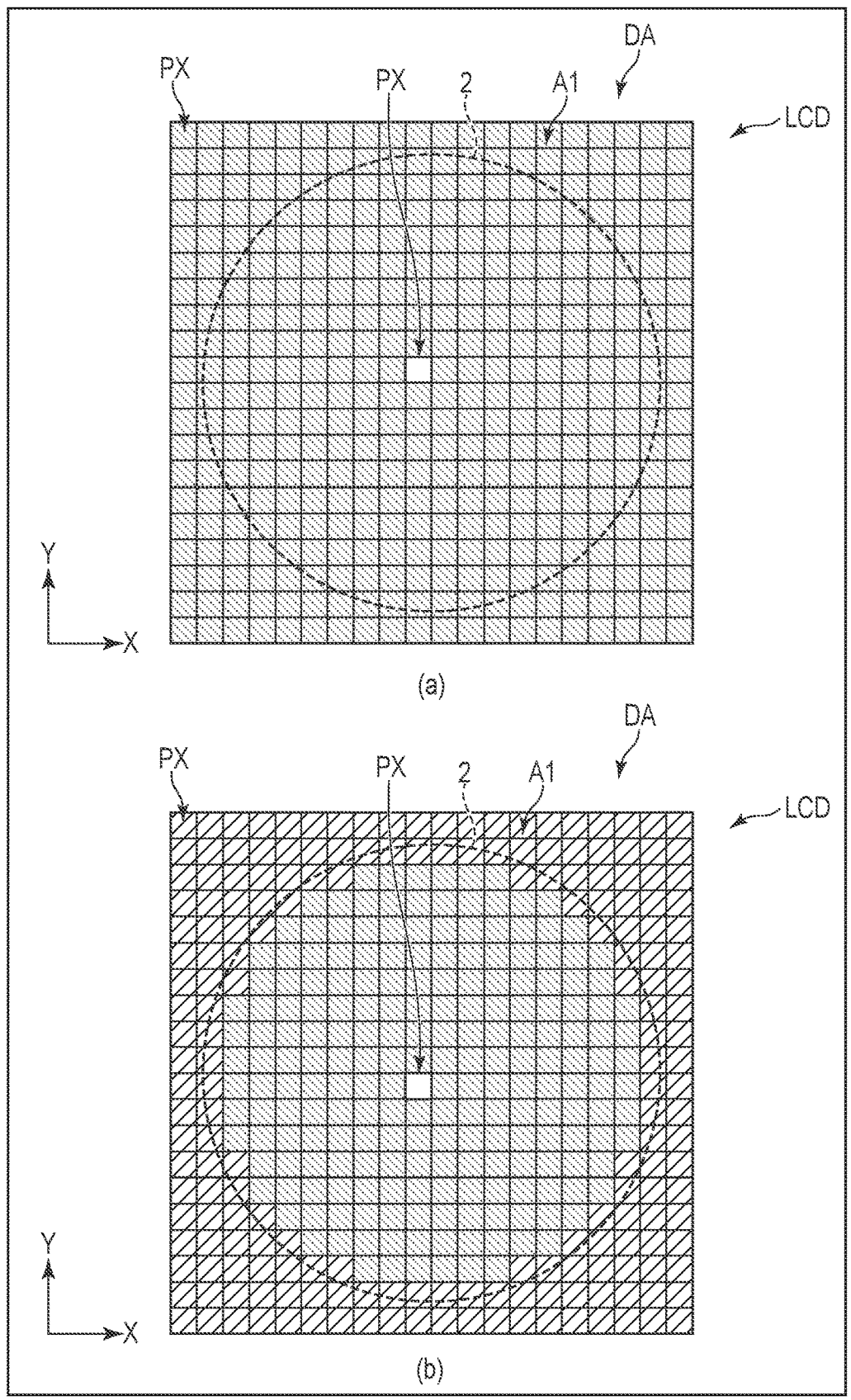
FIG. 14 is a plan view showing still another configuration example of the liquid crystal element LCD in the embodiment.

FIG. 14 is a plan view showing another configuration example of the liquid crystal element LCD in the embodiment. The configuration example shown in FIG. 14 is different from the other configuration examples in that the pixel PPX is not provided.

As shown in FIG. 14, all the pixels of the display area DA are formed by the pixels PX. In this configuration example, the number of pixels PX in the area A1 is approximately 400. The order of driving these approximately 400 pixels PX will be described. The pixels PX which are driven are indicated by upward-sloping hatch lines, and the pixels PX which are not driven are indicated by downward-sloping hatch lines.

When the pixels PX in the area A1 are driven, for example, the pixel PX located in the upper left of the drawing is driven, and the pixels are driven row by row from left to right until the pixel PX in the lower right of the drawing is driven.

Alternatively, the pixels PX in the area A1 are driven so as to spirally outward from the central pixel PX. FIG. 14, part (a) illustrates the situation when one pixel PX at the center of the liquid crystal element LCD is set in a transmissive state.

Or, the pixels PX in the area A1 are randomly driven. In this case, a plurality of pixels PX in the area A1 may be simultaneously switched to the transmissive state. When a plurality of pixels PX are set in the transmissive state, interference due to diffraction may occur, and therefore it is desirable to select a pattern in which interference due to diffraction is unlikely to occur or a pattern in which noise made by interference due to diffraction can be easily corrected.

Further, as shown in FIG. 14, part (b), such a method is also possible in which, of the approximately 400 pixels PX in the area A1, to sequentially drive only those pixels PX located on an inner side of the optical system 2 in plan view. In this case, the driving time for one pixel PX can be extended as compared to the case of driving all of the approximately 400 pixels PX.

With such a configuration example as well, an advantageous effect similar to that of the above-described configuration example which uses the pixel PPX can be obtained.

As described above, according to the embodiment, an electronic apparatus which can capture clear images can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Although it depends on, for example, the display mode of the liquid crystal panel PNL, the transparent electrode PPE of the pixel PPX may be formed without a slit PSL. Thus, the camera 1 can capture images even more clearly through the liquid crystal panel PNL.

What is claimed is:

1. An electronic apparatus comprising:
   a camera; and
   a liquid crystal panel comprising a display portion which overlaps the camera,
   the liquid crystal panel comprising:
   a first transparent electrode which overlaps the camera; and
   a light-shielding layer comprising a first opening having a circular shape and superposed on the first transparent electrode,
   the liquid crystal panel further comprising:
   a first signal line; and
   a metal wiring line superposed on the first signal line, and the metal wiring line is connected to the first transparent electrode.

2. The electronic apparatus of claim 1, wherein
   the liquid crystal panel further comprises a second signal line located between the first signal line and the first transparent electrode, and
   the metal wiring line intersects the second signal line in plan view.

3. The electronic apparatus of claim 1, wherein
   the liquid crystal panel further comprises:
   a first scanning line and a second scanning line each intersecting the first signal line;
   a second signal line adjacent to the first signal line; and
   a second transparent electrode located between the first scanning line and the second scanning line, and the first transparent electrode and the first opening are located between the first signal line and the second signal line, and between the first scanning line and the second transparent electrode.

4. The electronic apparatus of claim 3, wherein
   the liquid crystal panel further comprises:
   a switching element electrically connected to the first signal line and the second scanning line;
   a plurality of signal lines including the first signal line and the second signal line; and
   a plurality of scanning line including the first scanning line and the second scanning line,
   the second transparent electrode is electrically connected to the switching element, and
   the first transparent electrode is not electrically connected to the plurality of signal lines and the plurality of scanning lines.

5. The electronic apparatus of claim 1, wherein
   the camera comprises an optical system, and
   the optical system and the first opening are concentric circles in plan view.

6. The electronic apparatus of claim 1, wherein
   the first transparent electrode forms a first pixel,
   the liquid crystal panel further comprises:
   a first area overlapping at least the camera, in which the first pixel is disposed;
   a second area other than the first area;
   a plurality of scanning lines intersecting the first signal line, extending in a first direction in the first area and the second area, and arranged in a second direction intersecting the first direction at intervals;
   a plurality of signal lines including the first signal line, extending in the second direction in the first area and the second area, and arranged in the first direction at intervals; and
   a plurality of second pixels disposed in an area of the first area surrounding the first pixel, and the second area, each comprising a plurality of subpixels,
   each of the plurality of subpixels comprises:
   a switching element electrically connected to one corresponding scanning line of the plurality of scanning lines and one corresponding signal line of the plurality of signal lines; and
   a pixel electrode electrically connected to the switching element,
   the first transparent electrode is not electrically connected to the plurality of signal lines and the plurality of scanning lines, and
   the light-shielding layer further comprises a plurality of second openings superposed on the plurality of pixel electrodes.

7. The electronic apparatus of claim 6, wherein
   the first pixel and the plurality of second pixels are arranged in a matrix in the first direction and the second direction, and
   the first pixel is set alongside one second pixel of the plurality of second pixels in each of the first direction and the second direction.

8. The electronic apparatus of claim 6, wherein
   the first pixel and the plurality of second pixels are arranged in a matrix in the first direction and the second direction, and
   the first pixel is set alongside two or more second pixels of the plurality of second pixels in each of the first direction and the second direction.

9. The electronic apparatus of claim 6, wherein
each of the plurality of sub-pixels further comprises a colored layer, and
the first pixel is constituted without the colored layer.

\* \* \* \* \*